US012804016B2

(12) United States Patent
Vijayakumar et al.

(10) Patent No.: US 12,804,016 B2
(45) Date of Patent: Nov. 17, 2026

(54) SYSTEMS AND METHODS FOR ESTABLISHING A CALL ON A CELLULAR NETWORK

(71) Applicant: Boost SubscriberCo L.L.C., Englewood, CO (US)

(72) Inventors: Nikhil Rangaraajan Vijayakumar, Littleton, CO (US); Shailesh Adhikari, Highlands Ranch, CO (US)

(73) Assignee: Boost SubscriberCo L.L.C, Englewood, CO (US)

( * ) Notice: Subject to any disclaimer, the term of this patent is extended or adjusted under 35 U.S.C. 154(b) by 279 days.

(21) Appl. No.: 18/611,013

(22) Filed: Mar. 20, 2024

(65) Prior Publication Data

US 2025/0267176 A1 Aug. 21, 2025

Related U.S. Application Data

(60) Provisional application No. 63/553,857, filed on Feb. 15, 2024.

(51) Int. Cl.
*H04L 12/66* (2006.01)
*H04L 65/1016* (2022.01)
(Continued)

(52) U.S. Cl.
CPC ...... *H04L 65/1016* (2013.01); *H04L 65/1045* (2022.05); *H04L 65/1073* (2013.01); *H04L 65/1104* (2022.05)

(58) Field of Classification Search
CPC ............. H04L 65/1016; H04L 65/1073; H04L 65/1104; H04L 65/1069; H04L 65/1046;
(Continued)

(56) References Cited

U.S. PATENT DOCUMENTS 8,059,633 B2 * 11/2011 Heidermark ........ H04L 65/1104 370/352
2008/0182575 A1 * 7/2008 Torres .................. H04W 24/04 455/435.1

(Continued)

*Primary Examiner* — Kharye Pope
(74) *Attorney, Agent, or Firm* — Kipman T. Werking; Frontier IP Law PLLC

(57) ABSTRACT

Disclosed is a fallback mechanism and a silent redial technique using a second Proxy-Call Session Control Function (P-CSCF) address and third P-CSCF (or one or more other additional broadcasted P-CSCF addresses) to overcome voice call setup failures due to network error (e.g., an error indicated by a received Hypertext Transfer Protocol (HTTP) 500 series internal server error response). The user equipment device (UE) attempting to use one or more of the additional P-CSCFs as a fallback P-CSCF is performed silently such as not to alert the user. This is accomplished by silently de-registering from the first P-CSCF, registering on the second P-CSCF operating at a same generation of mobile network technology standard as the first P-CSCF, and sending a second SIP INVITE request to the second P-CSCF (i.e., performing a "silent redial"). As part of this "silent redial" process, the call screen continues to be displayed on the UE until the call is successfully established using the first P-CSCF or one of the additional fallback P-CSCFs, or the call attempt is ended, such as when the UE fails to establish the call using any of the additional P-CSCFs.

20 Claims, 8 Drawing Sheets

(51) Int. Cl.
*H04L 65/1045* (2022.01)
*H04L 65/1073* (2022.01)
*H04L 65/1104* (2022.01)

(58) Field of Classification Search
CPC ..... H04L 65/1094; H04L 65/40; H04L 69/40; H04L 65/1033; H04L 65/1045; H04L 63/028; H04L 67/141; H04M 1/2535; H04M 1/72436; H04M 3/42; H04M 7/006; H04W 80/10; H04W 36/00226; H04W 4/00; H04W 60/06; H04W 60/04
See application file for complete search history.

(56) References Cited

U.S. PATENT DOCUMENTS

| | | | | |
|---|---|---|---|---|
| 2012/0113796 | A1* | 5/2012 | Qiu | H04L 65/1073<br>370/216 |
| 2018/0132291 | A1* | 5/2018 | Kalepu | H04W 76/18 |
| 2018/0176876 | A1* | 6/2018 | Alam | H04W 60/00 |
| 2018/0278659 | A1* | 9/2018 | Liao | H04L 65/1104 |
| 2020/0153874 | A1* | 5/2020 | Christopher | H04L 65/1069 |
| 2021/0377817 | A1* | 12/2021 | Lu | H04W 36/305 |
| 2022/0116750 | A1* | 4/2022 | Naik | H04W 76/25 |
| 2024/0015604 | A1* | 1/2024 | Zhang | H04W 36/00224 |
| 2025/0088548 | A1* | 3/2025 | Rahman | H04L 65/1069 |

* cited by examiner

SYSTEMS AND METHODS FOR ESTABLISHING A CALL ON A CELLULAR NETWORK

BRIEF SUMMARY

Internet Protocol Multimedia Subsystem (IMS) is a network architecture used in wireless networks, including Fourth Generation (4G) and Fifth Generation (5G) cellular networks, to enable rich communication services. IMS is used in both 4G Long Term Evolution (LTE) and 5G New Radio (NR) networks for Internet Protocol (IP) based voice calls and Short Message Service (SMS) services. IMS is used in 5G NR networks to enable packet-switched voice calls and SMS services through the Voice over NR (VoNR) technology, also known as Voice over 5G (Vo5G). Voice calls and SMS use VoNR (Vo5G) in 5G standalone (5G SA) and VOLTE in non-standalone 5G (5G NSA). IMS was initially defined by Third Generation Partnership Project (3GPP) in Release 5 and is based on the protocols defined by the standards organization Internet Engineering Task Force (IETF). Session Initiation Protocol (SIP) has been standardized by IETF and is the protocol used by IMS for enabling voice calls and other real-time services.

During 5G SA IMS registration, the network may broadcast IP addresses for three different geographical locations within the same IMS region. For example, these addresses may be for three different Proxy-Call Session Control Functions (P-CSCFs) in the same IMS region. The first address of these two addresses may be for a first P-CSCF, the second address may be for a second P-CSCF and the third address may be for a third P-CSCF in which the second and third P_CSCF addresses are to use as a fallbacks in case an IMS registration fails on the first P-CSCF.

However, after IMS registration, when call setup failures using IMS are observed due to network errors, such as when a Hypertext Transfer Protocol (HTTP) 500 series internal server error response is received by a user equipment device (UE) attempting to place a call, the call may drop immediately. These issues can often be isolated to a particular IMS server in the region.

In order to solve the technical problem of a call attempt being dropped after registration and improve voice call success rate and user experience on the network, described herein is a technical solution that includes a fallback mechanism and a silent redial technique using the second P-CSCF address (and possibly the third P-CSCF address and additional broadcasted P-CSCF addresses) for voice call setup failures due to network error (e.g., an error indicated by a received HTTP 500 series internal server error response).

In an example embodiment, the UE attempting to use one or more of the additional P-CSCFs as a fallback P-CSCF is performed silently such as not to alert the user by silently de-registering from the first P-CSCF, registering on the second P-CSCF and sending a second SIP INVITE request to the second P-CSCF (i.e., performing a “silent redial”). As part of this “silent redial” process, the de-registration occurs without ending the call on the call manager in the UE and the call screen continues to be displayed on the UE until the call is successfully established using the first P-CSCF or one of the additional fallback P-CSCFs, or the call attempt is ended, such as when the UE fails to establish the call using any of the additional P-CSCFs.

In an example embodiment, after the UE receives the error response, the UE 122 de-registers from the first P-CSCF and then may register on a second P-CSCF operating at the same generation of mobile network technology standard as the first P-CSCF. For example, the first P-CSCF may be a 5G NR P-CSCF operating at the 5G NR mobile technology standard and thus, as part of the 5G NR Network Core, the second P-CSCF on which the UE registers as a fallback alternative P-CSCF for making the call is also a 5G NR P-CSCF operating at the 5G NR mobile technology standard. This is such that the user does not experience a degradation in service due to switching to using an IMS server or other server of a previous or legacy generation of mobile network technology.

Prior to sending the first SIP INVITE request, the UE may have received Internet Protocol (IP) addresses for one or more additional P-CSCFs (which may also be referred to generally as IMS servers), including a second P-CSCF, a third P-CSCF and possibly one or more additional P-CSCFs, via broadcast messages from the Fifth Generation New Radio (5G NR) Network Core. In an example embodiment, the 5G NR Network Core may be a standalone (SA) 5G network implemented entirely on one or more public or private cloud computing servers. In some embodiments, one or more of the additional P-CSCFs, including the second P-CSCF and third P-CSCF, may each be in a different geographical location from the first P-CSCF and/or each other within a same IMS region as the first P-CSCF and/or each other. For example, the network can configure more than two P-CSCFs during registration on the network of UE. In fact, on a cloud computing platform (e.g., Amazon Web Services (AWS)), each region may have three geographically isolated availability zones where P-CSCFs can be configured. Thus, the additional P-CSCFs, including second P-CSCF and third P-CSCF, may be used by the UE as fallback alternatives to the first P-CSCF while placing the call when the UE is not initially able to connect the call while registered on the first P-CSCF. This may occur, for example, when there is a network issue affecting a particular region, geographic location within the region or particular cloud computing data center hosting the first P-CSCF, second P-CSCF, third P-CSCF or other additional alternative P-CSCFs. In an example embodiment, the mechanism including the process described above is only to be triggered when there is more than one P-CSCF configured and received by the UE from the 5G NR Core 102 in a Packet Data Unit (PDU) session establishment accept message for an IMS Access Point Name (APN).

In some embodiments, the techniques described herein include a method that includes: a first user equipment device (UE) performing an Internet Protocol Multimedia Core Network Subsystem (IMS) registration in a cellular telecommunications network on a first Proxy-Call Session Control Function (P-CSCF) of the cellular telecommunications network; the first UE sending a first Session Initiation Protocol (SIP) INVITE request to the first P-CSCF thereby initiating a dialog for establishing a call on the cellular telecommunications network with a second UE; in response to sending the first SIP INVITE request, the first UE receiving an error response preventing the call from connecting; and after the first UE receives the error response: the first UE de-registering from the first P-CSCF; the first UE registering on a second P-CSCF operating at a same generation of mobile network technology standard as the first P-CSCF; and the first UE sending a second SIP INVITE request to the second P-CSCF to initiate the dialog for establishing the same call on the cellular telecommunications network with the second UE.

In some embodiments, the techniques described herein include a method wherein the first UE de-registering from the first P-CSCF, the first UE registering on the second P-CSCF and the first UE sending the second SIP INVITE request to the second P-CSCF are performed silently without performing actions that would alert a UE user and while the UE still appears to be initiating the dialog for establishing the same call.

In some embodiments, the techniques described herein include a method wherein the first UE de-registering from the first P-CSCF, the first UE registering on the second P-CSCF and the first UE sending the second SIP INVITE request to the second P-CSCF are performed silently without ending the call on the call manager in the UE and while a call screen remains active on the UE indicating a call is currently being attempted.

In some embodiments, the techniques described herein include a method wherein the first UE de-registering from the first P-CSCF, the first UE registering on the second P-CSCF and the first UE sending the second SIP INVITE request to the second P-CSCF are performed immediately in response to first UE receiving the error response.

In some embodiments, the techniques described herein include a method wherein the first UE de-registering from the first P-CSCF, the first UE registering on the second P-CSCF and the first UE sending the second SIP INVITE request to the second P-CSCF are performed in response to the first UE receiving the error response and the error response not indicating to re-try establishing the call through the first P-CSCF.

In some embodiments, the techniques described herein include a method wherein the first UE waits a pre-determined amount of time to allow time for the UE to de-register from the first P-CSCF and register on the second P-CSCF before sending the second SIP INVITE request.

In some embodiments, the techniques described herein include a method wherein the pre-determined amount of time is about three seconds.

In some embodiments, the techniques described herein include a method wherein the error response is an Hypertext Transfer Protocol (HTTP) 500 series internal server error response.

In some embodiments, the techniques described herein include a method, further including: in response to the first UE sending a second SIP INVITE request to the second P-CSCF, the call with the second UE being successfully established on the second P-CSCF.

In some embodiments, the techniques described herein include a method, further including: the UE remaining registered on the second P-CSCF after the call is ended until a next IMS registration is triggered either by the cellular telecommunications network or as a result of user input to the UE.

In some embodiments, the techniques described herein include a method wherein the first UE receives the error response from a Fifth Generation New Radio (5G NR) standalone (SA) network core.

In some embodiments, the techniques described herein include a method, further including, before performing the IMS registration on the first P-CSCF, the UE receiving an Internet Protocol (IP) address for the first P-CSCF and second P-CSCF, wherein the registration on the first P-CSCF is performed using the IP address of the first P-CSCF and the registration on the second P-CSCF is performed using the IP address of the second P-CSCF.

In some embodiments, the techniques described herein include a method, further including: in response to sending the second SIP INVITE request, the first UE receiving an additional error response preventing the call from connecting; in response to receiving the additional error response, the UE ending the dialog for establishing the call and ceasing to attempt to establish the call.

In some embodiments, the techniques described herein include a method, further including: in response to sending the second SIP INVITE request, the first UE receiving an additional error response preventing the call from connecting; and in response to receiving the additional error response, cycling through process including: de-registering from a P-CSCF on which the UE is currently registered; then registering on an additional alternative P-CSCF, the IP address of which had been previously broadcast to the UE prior to the registration on the first P-CSCF; and then sending an additional SIP INVITE request to the P-CSCF on which the UE is currently registered, until either: the call is successfully established on a P-CSCF the UE is currently registered on or there are no additional alternative P-CSCFs that were made available to the UE via broadcast of a respective P-CSCF IP, whichever occurs first.

In some embodiments, the techniques described herein include a method, further including: in response to receiving a subsequent error response after sending the additional SIP INVITE request to the additional alternative P-CSCF and there being no additional alternative P-CSCFs that were made available to the UE, the UE ending the dialog for establishing the call and ceasing to attempt to establish the call.

In some embodiments, the techniques described herein include a method wherein the second P-CSCF is provided to the UE via broadcasting of an IP address of the second P-CSCF before the performing of the registration as a fallback alternative to the first P-CSCF during making a call such that the second P-CSCF is in a different geographical location within a same IMS region as the first P-CSCF. In an example embodiment, the mechanism including the process described above is only to be triggered when there is more than one P-CSCF configured and received by the UE from the 5G NR Core 102 in a Packet Data Unit (PDU) session establishment accept message for an IMS Access Point Name (APN).

In some embodiments, the techniques described herein include a method wherein the error response is caused by an issue in a region of the first P-CSCF.

In some embodiments, the techniques described herein include a method wherein: the cellular telecommunications network is a 5G standalone (SA) cellular network including a 5G NR SA network core that is implemented entirely in one or more cloud computing servers; the first P-CSCF is part of an IMS layer of the 5G NR SA network core and is configured to enable the UE to communicate using the 5G NR SA cellular network; and the second P-CSCF is part of the IMS layer of the 5G NR SA network core and is configured to enable the UE to communicate using the 5G SA cellular network.

In some embodiments, the techniques described herein include a method wherein the call on the cellular telecommunications network is a Voice over New Radio (VoNR) call.

In some embodiments, the techniques described herein include a method wherein the generation of mobile network technology standard is 5G NR.

In some embodiments, the techniques described herein include a method including one or more operations described herein.

In some embodiments, the techniques described herein include a system including: at least one memory that stores computer executable instructions; and at least one processor that executes the computer executable instructions to cause operations to be performed, the operations including: one or more operations described herein.

In some embodiments, the techniques described herein include a non-transitory computer-readable storage medium having computer-executable instructions stored thereon that, when executed by at least one processor, cause the at least one processor to cause operations to be performed, the operations including: one or more operations described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
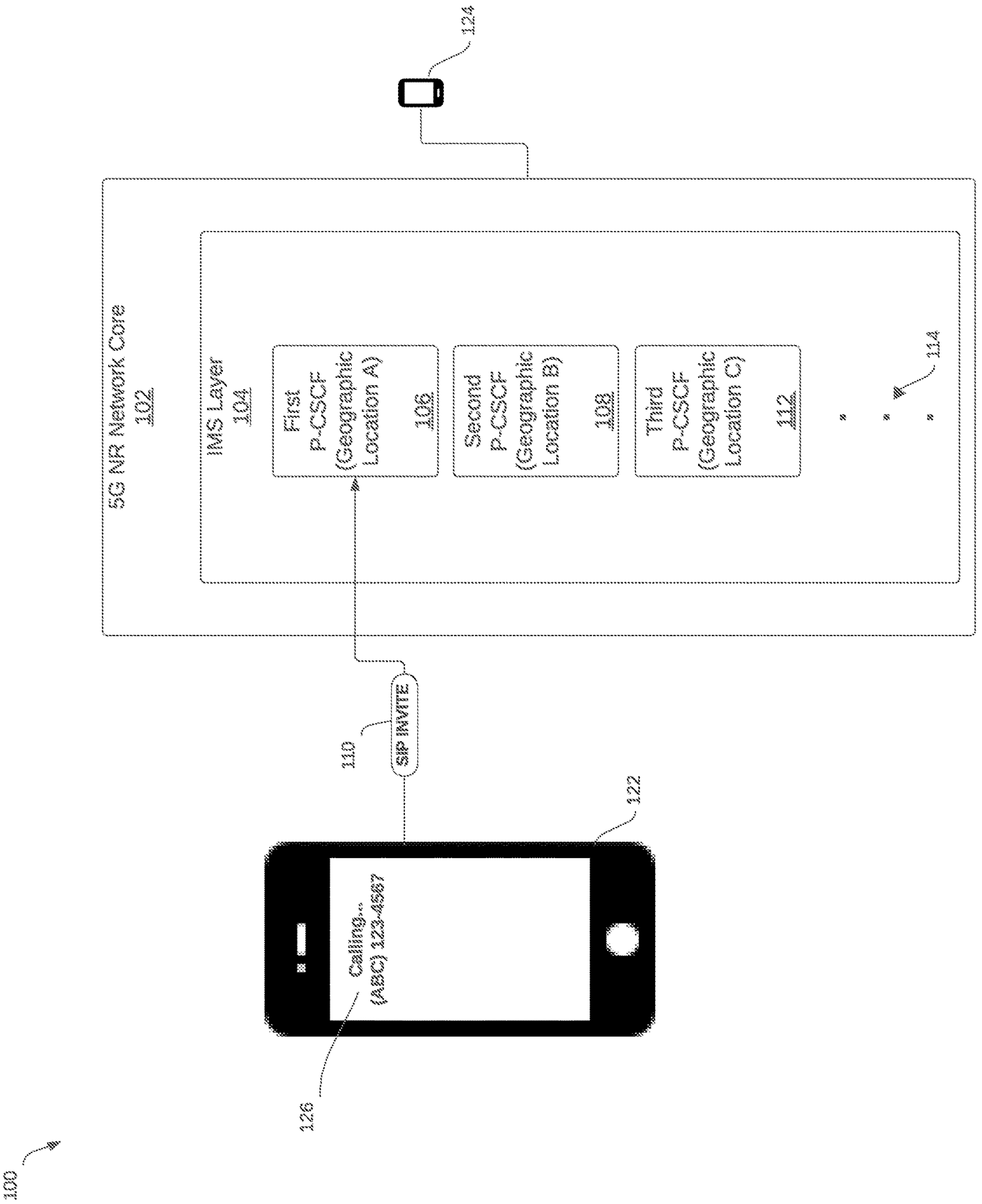
FIG. 1 illustrates a system for establishing a call on a cellular network including a user equipment device (UE) sending a first Session Initiation Protocol (SIP) INVITE request to a first Proxy-Call Session Control Function (P-CSCF) in accordance with embodiments described herein.

FIG. 1 illustrates a system 100 for establishing a call on a cellular network including a user equipment device (UE) 122 sending a first Session Initiation Protocol (SIP) INVITE request 110 to a first Proxy-Call Session Control Function (P-CSCF) 106 in accordance with embodiments described herein.

In an example embodiment, the UE 122 may send the first SIP INVITE request 110 to the first P-CSCF 106 in an Internet Protocol Multimedia Core Network Subsystem (IMS) layer 104, thereby initiating a dialog for establishing a call with a second UE 124 on the cellular telecommunications network (e.g., a Voice over New Radio (VoNR) call). In the present example, this sending of the first SIP INVITE request 110 to the first P-CSCF 106 may occur as a result of a user using UE 122 to place a VoNR call to telephone number (ABC) 123-4567 of UE 124. As shown, a call screen 126 indicating to the user the call is in the process of being placed is displayed on UE 122 while the first SIP INVITE request 110 is sent to the first P-CSCF 106 and without ending the call on the call manager in the UE.

Prior to sending the first SIP INVITE request 110, the UE 122 may have received Internet Protocol (IP) addresses for one or more additional P-CSCFs (which may also be referred to generally as IMS servers), including second P-CSCF 108, third P-CSCF 112 and possibly one or more additional P-CSCFs 114 in IMS layer 104, via broadcast messages from the Fifth Generation New Radio (5G NR) Network Core 102. In an example embodiment, the 5G NR Network Core 102 may be a standalone (SA) 5G network implemented entirely on one or more public or private cloud computing servers. In some embodiments, one or more of the additional P-CSCFs, including second P-CSCF 108 and third P-CSCF 112 108, may each be in a different geographical location from the first P-CSCF 106 and/or each other within a same (or different) IMS region as the first P-CSCF 106 and/or each other. For example, the network can configure more than two P-CSCFs during registration on the network of UE 122. In fact, on a cloud computing platform (e.g., Amazon Web Services (AWS)), each region may have three geographically isolated availability zones where P-CSCFs can be configured. Thus, the additional P-CSCFs, including second P-CSCF 108 and third P-CSCF 112, may be used by the UE 122 as fallback alternatives to the first P-CSCF while placing the call (e.g., to UE 124) when the UE 122 is not initially able to connect the call while registered on the first P-CSCF 106. This may occur, for example, when there is a network issue affecting a particular region, geographic location within the region or particular cloud computing data center hosting the first P-CSCF 106, second P-CSCF 108, third P-CSCF 112 or other additional alternative P-CSCFs 114.

Figure 2:
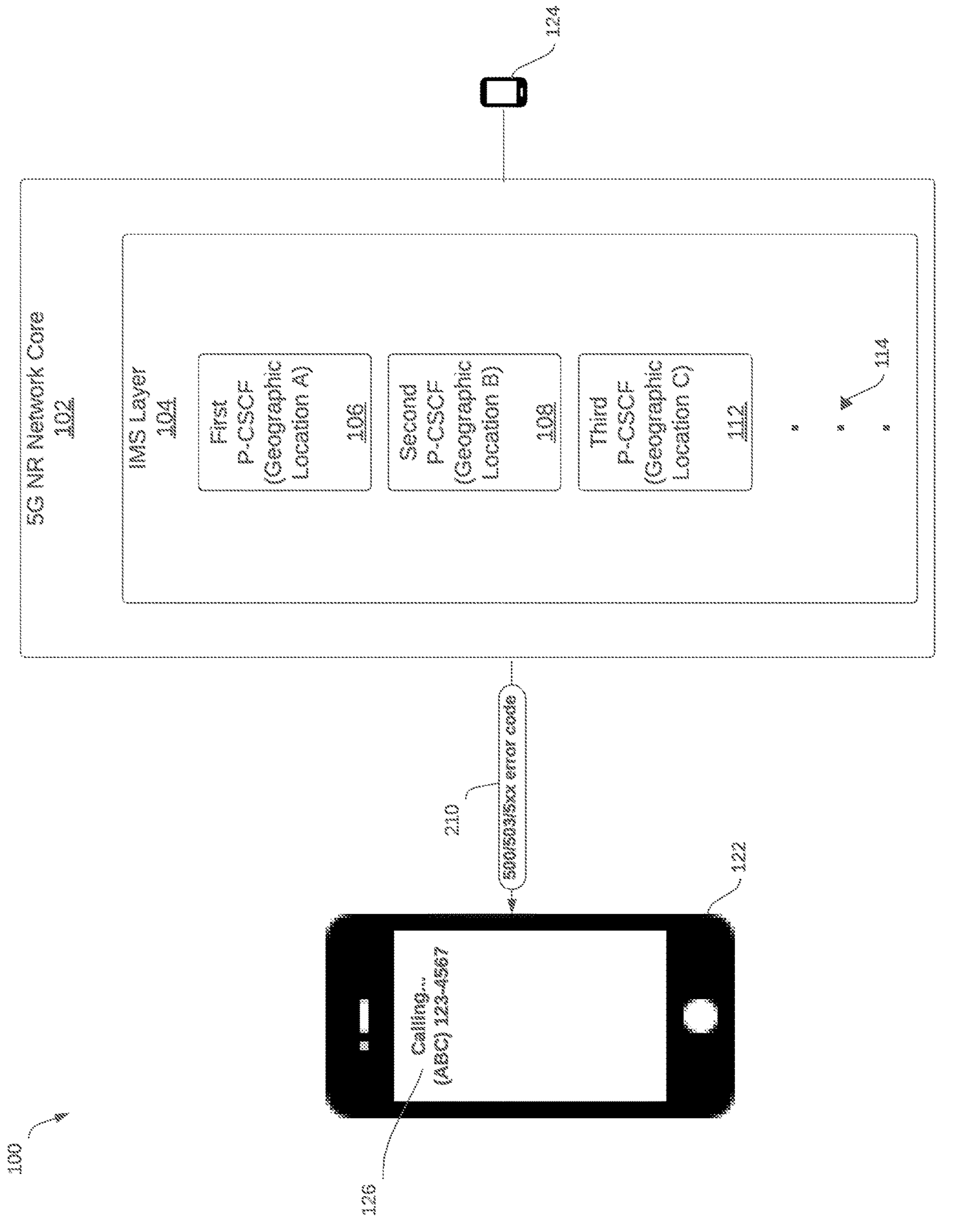
FIG. 2 illustrates the system of FIG. 1 for establishing a call on the cellular network including the UE receiving a Hypertext Transfer Protocol (HTTP) 500 series internal server error response in response to sending the first SIP INVITE request in accordance with embodiments described herein.
Figure 3:
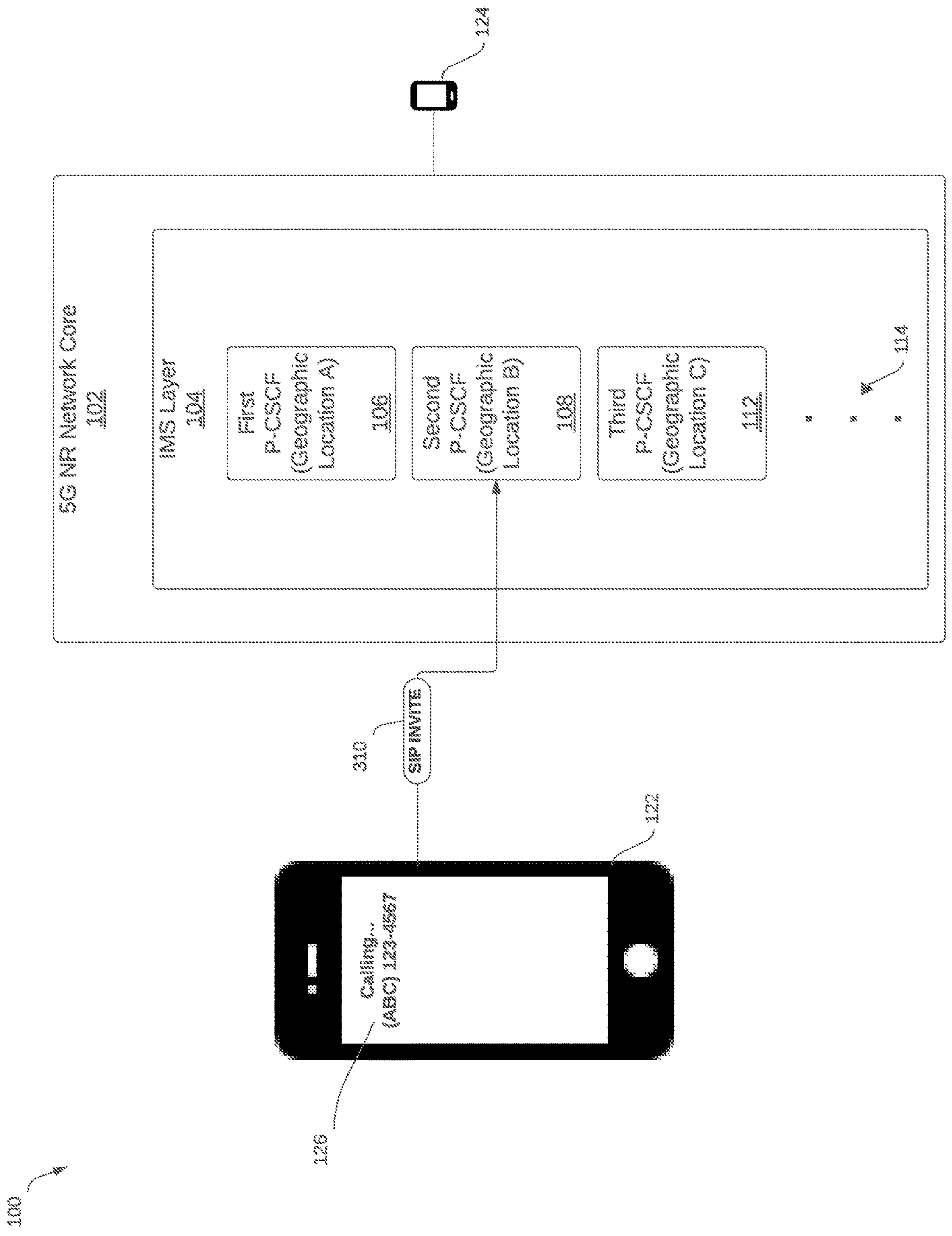
FIG. 3 illustrates the system of FIG. 1 for establishing a call on the cellular network including the UE sending a second SIP INVITE request to a second P-CSCF to initiate the dialog for establishing the same call in accordance with embodiments described herein.

In an example embodiment, the UE 122 attempting to use one or more of the additional P-CSCFs, including second P-CSCF 108, as a fallback P-CSCF is performed silently such as not to alert the user by silently de-registering from the first P-CSCF 106, registering on second P-CSCF 108 and sending a second SIP INVITE request to second P-CSCF 108 (i.e., performing a "silent redial" to telephone number (ABC) 123-4567), as illustrated in more detail in FIG. 2 and FIG. 3. As part of this "silent redial" process, the call is not ended on the call manager in the UE and the call screen 126 continues to be displayed on the UE 122 until the call is successfully established using the first P-CSCF 106, second P-CSCF or one of the additional fallback P-CSCFs 114, or the call attempt is ended, such as when the UE fails to establish the call using any of the additional P-CSCFs. The number of additional P-CSCFs 114 made available for use by the UE 122 as fallback alternatives to the first P-CSCF 106 and second P-CSCF 108 may vary in different embodiments, including one, two or more additional P-CSCFs 114. In an example embodiment, the mechanism including the process described above is only to be triggered when there is more than one P-CSCF configured and received by the UE from the 5G NR Core 102 in a Packet Data Unit (PDU) session establishment accept message for an IMS Access Point Name (APN).

FIG. 2 illustrates the system 100 of FIG. 1 for establishing a call on the cellular network including the UE 122 receiving a Hypertext Transfer Protocol (HTTP) 500 series internal server error response 210 in response to sending the first SIP INVITE request 110 (shown in FIG. 1) in accordance with embodiments described herein.

In response to sending the first SIP INVITE request, the UE 122 may receive an error response 210 preventing the call from connecting. In the present example embodiment, the error response is an HTTP 500 series internal server error response 210. For example, HTTP status code 500 is a generic error response. It means that the server (e.g., first P-CSCF 106) encountered an unexpected condition that prevented it from fulfilling the request. Other error responses may be received in other embodiments an acted upon as described herein regarding error response 210. In the present example, error response 210 may be an indication that UE 122 is not initially able to connect the call to phone number (ABC) 123-4567 while UE 122 is registered on first P-CSCF 106. For example, the HTTP 500 series internal server error response 210 may be sent from the 5G NR Network Core 102 as a result of there being a network issue affecting a particular region, geographic location within the region, particular cloud computing data center hosting the first P-CSCF 106, network connectivity of the first P-CSCF 106, or an issue regarding a malfunction of the first P-CSCF 106 or other network issue.

FIG. 3 illustrates the system 100 of FIG. 1 for establishing a call on the cellular network including the UE 122 sending a second SIP INVITE request 310 to the second P-CSCF 108 to initiate the dialog for establishing the same call in accordance with embodiments described herein.

In an example embodiment, after the UE 122 receives the error response 210 shown in FIG. 2, the UE 122 de-registers from the first P-CSCF 106 and then may register on second P-CSCF 108 operating in the same region on the same generation of mobile network technology standard as the first P-CSCF. For example, the first P-CSCF 106 is a 5G NR P-CSCF operating in a particular region at the 5G NR mobile technology standard and thus, as part of the 5G NR Network Core 102, the second P-CSCF on which the UE 122 registers as a fallback alternative P-CSCF for making the call is also a 5G NR P-CSCF operating at the 5G NR mobile technology standard in a different geographic location within the same particular region as first P-CSCF 106. This is such that the user does not experience a degradation in service due to switching to using an IMS server or other server of a previous or legacy generation of mobile network technology. The UE 122 then sends a second SIP INVITE request to the second P-CSCF 108 to initiate the dialog for establishing the same call to (ABC) 123-4567 on the cellular telecommunications network with the UE 124. If an error response is also received in response to sending the second SIP INVITE request to the second P-CSCF 108, then the above process may repeat for the third P-CSCF 112. These steps are performed silently such as not to alert the user. As part of this "silent redial" process, the call is not ended on the call manager in the UE and the call screen 126 continues to be displayed on the UE 122 until the call is successfully established using the first P-CSCF 106, second P-CSCF 108 or one of the additional fallback P-CSCFs 114, or the call attempt is ended, such as when the UE fails to establish the call using any of the additional P-CSCFs.

In an example embodiment, the mechanism including the process described above is only to be triggered when there is more than one P-CSCF configured and received by the UE from the 5G NR Core 102 in a Packet Data Unit (PDU) session establishment accept message for an IMS Access Point Name (APN).

In an example embodiment, if the SIP REGISTER fails during silent redial phase on any of the subsequent attempted P-CSCFs after receiving the error response (e.g., 5xx error 210 for SIP INVITE) on the first P-CSCF 106, UE 122 has a guard timer (example: 4 seconds) from the time the 5xx error 210 is received on the first P-CSCF 106 to the time the SIP INVITE 310 is sent on the second P-CSCF 108. If the SIP INVITE 310 is not able to be sent on the second P-CSCF 108 after successful IMS registration on the second P-CSCF 108 before the guard timer elapses, the UE 122 will start the timer again, try SIP REGISTER on third P-CSCF 112 (if available) and send a SIP INVITE before the timer elapses again. If the SIP INVITE is not sent within the guard timer value on the third P-CSCF 112, the UE 122 will drop the call immediately and register back on the first P-CSCF 106.

Figure 4:
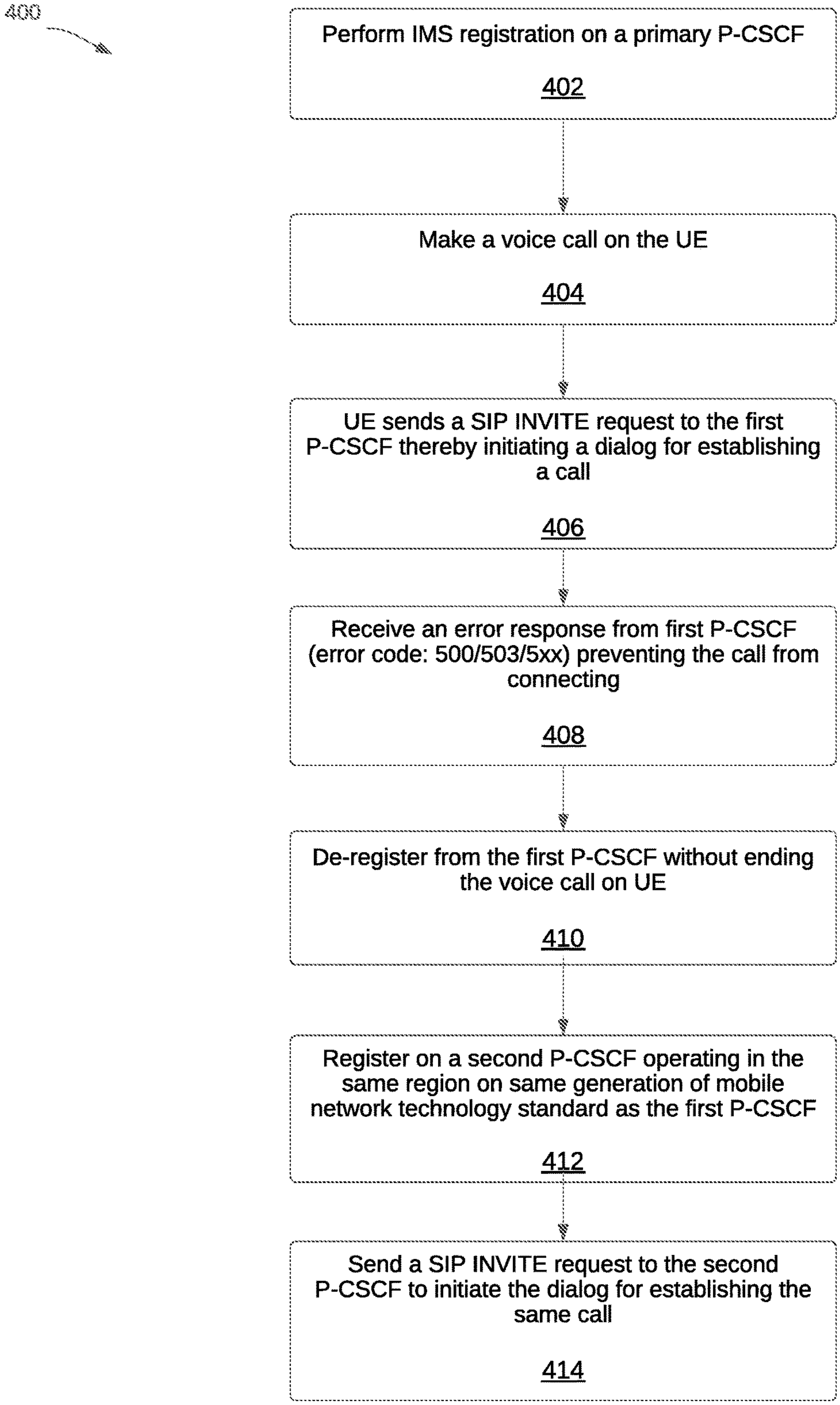
FIG. 4 illustrates a logical flow diagram showing an example embodiment of a process for establishing a call on a cellular network in accordance with embodiments described herein.

FIG. 4 illustrates a logical flow diagram showing an example embodiment of a process 400 for establishing a call (e.g., Voice over New Radio (VoNR) call) on a cellular network in accordance with embodiments described herein. In an example embodiment, process 400 and other processes described herein may be implemented on or performed by system 100 shown in FIG. 1, FIG. 2 and FIG. 3.

At 402, a first user equipment device (UE) performs an Internet Protocol Multimedia Core Network Subsystem (IMS) registration in a cellular telecommunications network on a first Proxy-Call Session Control Function (P-CSCF) of the cellular telecommunications network.

At 404, a voice call is made on the first UE to a second UE.

At 406, the first UE sends a first Session Initiation Protocol (SIP) INVITE request to the first P-CSCF thereby initiating a dialog for establishing a call on the cellular telecommunications network with a second UE.

At 408, in response to sending the first SIP INVITE request, the first UE receives an error response from the first P-CSCF (Hypertext Transfer Protocol (HTTP) error response: 500/503/5xx) error responsepreventing the call from connecting. error responseerror response At 410, after the first UE receives the error responsere-sponse, the first UE de-registers from the first P-CSCF without ending the voice call on the UE. For example, the first UE may receive the error response from a Fifth Generation New Radio (5G NR) standalone (SA) network core.

At 410, the first UE then registers on a second P-CSCF operating in the same region on a same generation of mobile network technology standard (e.g., 5G NR) as the first P-CSCF. In an example embodiment, the cellular telecommunications network is a 5G standalone (SA) cellular network including a 5G NR SA network core that is implemented entirely in one or more cloud computing servers; the first P-CSCF is part of an IMS layer of the 5G NR SA network core and is configured to enable the UE to communicate using the 5G NR SA cellular network; and the second P-CSCF is part of the IMS layer of the 5G NR SA network core and is configured to enable the UE to communicate using the 5G SA cellular network.

In an example embodiment, before performing the IMS registration on the first P-CSCF, the UE receives an Internet Protocol (IP) address for the first P-CSCF, second P-CSCF, third P-CSCF and possibly additional P-CSCFs. The registration on the first P-CSCF is performed using the IP address of the first P-CSCF, the registration on the second P-CSCF is performed using the IP address of the second P-CSCF, a registration on the third P-CSCF may be performed using the IP address of the third P-CSCF and registrations on the possible additional P-CSCFs may be performed using the respective IP addresses of those additional P-CSCFs. In some embodiments, the second P-CSCF is provided to the UE via broadcasting of an IP address of the second P-CSCF before the performing of the registration as a fallback alternative to the first P-CSCF during making a call, such that the second P-CSCF is in a different geographical location within a same IMS region as the first P-CSCF. This same process may be performed for the third P-CSCF and possible additional P-CSCFs if needed to establish the call.

At 412, the first UE then sends a SIP INVITE request to the second P-CSCF to initiate the dialog for establishing the same call on the cellular telecommunications network with the second UE. In some embodiments, the first UE waits a pre-determined amount of time (e.g., three seconds) to allow time for the UE to de-register from the first P-CSCF and register on the second P-CSCF before sending the second SIP INVITE request.

The first UE de-registering from the first P-CSCF, the first UE registering on the second P-CSCF and the first UE sending the SIP INVITE request to the second P-CSCF are performed silently without performing actions that would alert a UE user and while the UE still appears to be initiating the dialog for establishing the same call. Also, the first UE de-registering from the first P-CSCF, the first UE registering on the second P-CSCF and the first UE sending the second SIP INVITE request to the second P-CSCF may be performed silently without performing actions that would alert a UE user and while the UE still appears to be initiating the dialog for establishing the same call. In some embodiments, first UE de-registering from the first P-CSCF, the first UE registering on the second P-CSCF and the first UE sending the second SIP INVITE request to the second P-CSCF are performed immediately in response to first UE receiving the error response. In some embodiments, the error response is caused by an issue in a region of the first P-CSCF.

The above process may be performed for the third P-CSCF and possible additional P-CSCFs if needed to establish the call.

In some embodiments, the first UE de-registering from the first P-CSCF, the first UE registering on the second P-CSCF and the first UE sending the second SIP INVITE request to the second P-CSCF are performed in response to the first UE receiving the error response and the error response not indicating to re-try establishing the call through the first P-CSCF. For example, in an embodiment, if a retry-after header is present along with the error response (e.g., 5*xx* error), the P-CSCF switching and silent redial algorithm above will be suspended and retry-after header will be honored.

In response to the first UE sending a SIP INVITE request to the second P-CSCF, the call with the second UE may be successfully established on the second P-CSCF. In such instances, the UE remains registered on the second P-CSCF after the call is ended until a next IMS registration is triggered either by the cellular telecommunications network or as a result of user input to the UE.

Figure 5:
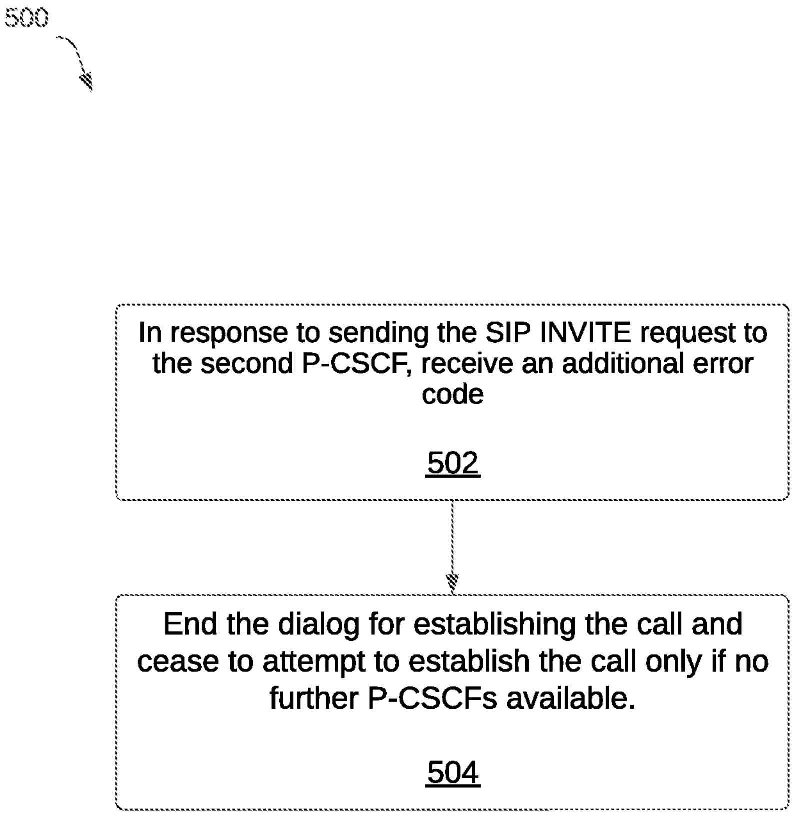
FIG. 5 illustrates a logical flow diagram showing an example embodiment of a process, useful in the process of FIG. 4, for how to proceed when receiving an additional error response from the network in accordance with embodiments described herein.

On the other hand, FIG. 5 illustrates a logical flow diagram showing an example embodiment of a process 500 for how to proceed when receiving an additional error response from the network in accordance with embodiments described herein.

At 502, in response to sending the SIP INVITE request to the second P-CSCF, the first UE may receive an additional error response preventing the call from connecting.

At 504, in response to receiving the additional error response, the UE may end the dialog for establishing the call, end the call on the call manager in the UE and cease to attempt to establish the call, thereby ending the call attempt (and may close the call screen on the UE) only if no further P-CSCFs are available after performing attempts to send respective SIP invites on the other P-CSCFs in a cyclic manner and each attempted P-CSCF throws a network error (error response: 500/503/5xx). For example, if the third P-CSCF is available, the device must try the same on that before ending the call.

In the present example embodiment, the UE does not register on the first P-CSCF after failure on the last P-CSCF, if registration is successful and SIP INVITE returns an error on the last tried P-CSCF. The UE remains registered on the last P-CSCF until the next call fails on it or there is an IMS re-registration due to an airplane mode ON/OFF operation, a UE reboot or a periodic re-registration on the network being performed.

In an example embodiment, on the active voice call after receiving the error response (e.g., 5xx error) from the current serving P-CSCF, the UE will try the SIP INVITE/REGISTER only once on the remaining available P-CSCF for SIP registration and silent redial. When an error response (e.g., 5xx error) is returned by all available P-CSCFs once either during the SIP REGISTER or the SIP INVITE stage for each available P-CSCF, the UE will end the call and register back on the P-CSCF from where the call originated initially.

In an example embodiment, if the SIP REGISTER fails during silent redial phase on any of the subsequent attempted P-CSCFs after receiving the error response (e.g., 5xx error 210 for SIP INVITE) on the first P-CSCF, the UE has a guard timer (example: 4 seconds) from the time the 5xx error is received on the first P-CSCF to the time the SIP INVITE is sent on the second P-CSCF. If the SIP INVITE is not able to be sent on the second P-CSCF after successful IMS registration on the second P-CSCF before the guard timer elapses, the UE will start the timer again, try SIP REGISTER on third P-CSCF 112 (if available) and send a SIP INVITE before the timer elapses again. If the SIP INVITE is not sent within the guard timer value on the third P-CSCF, the UE 122 will drop the call immediately and register back on the first P-CSCF 106.

Figure 6A:
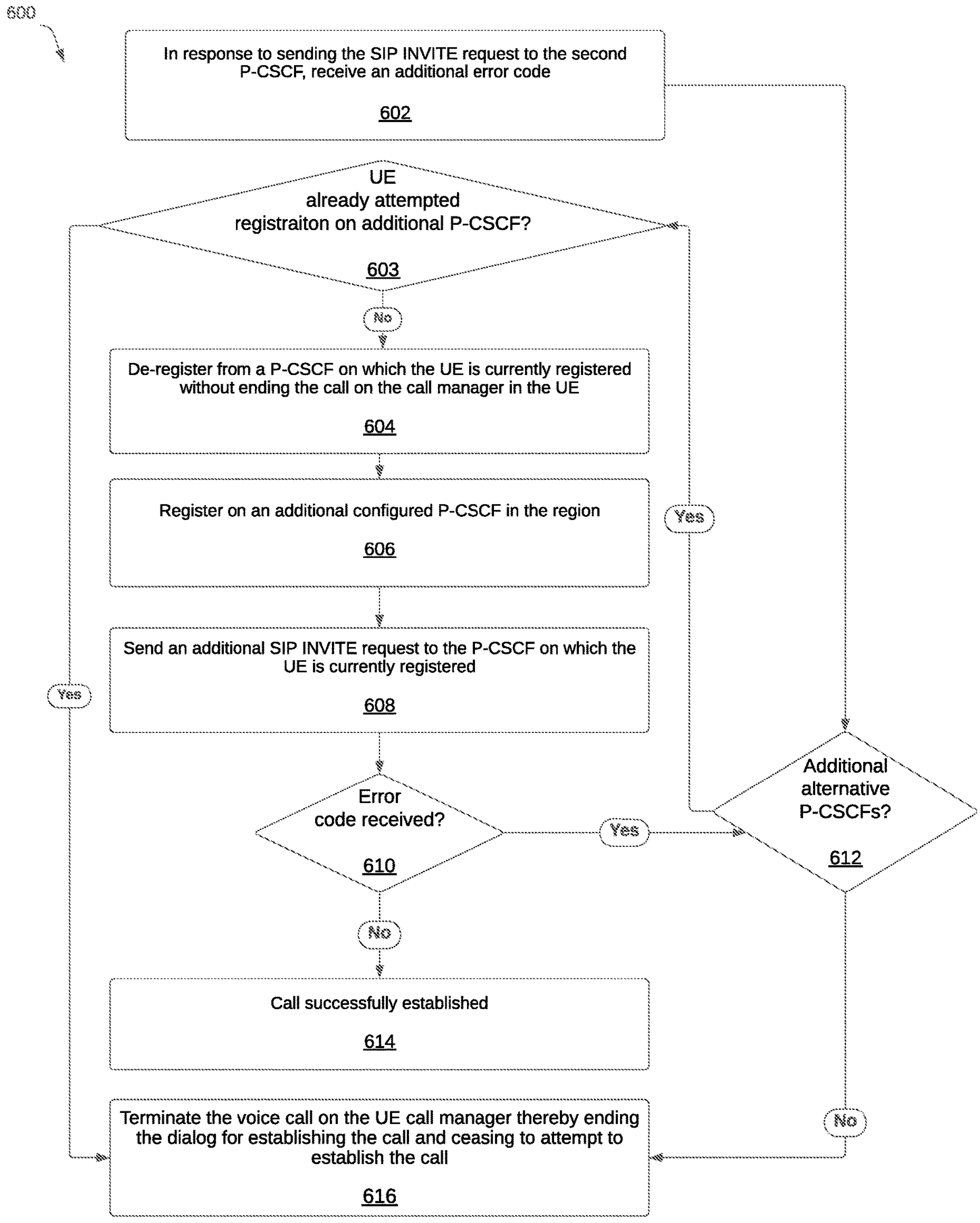
FIG. 6A illustrates a logical flow diagram showing an example embodiment of a process, useful in the process of FIG. 4, for how to proceed when receiving an additional error response from the network and there are additional alternative P-CSCFs in accordance with embodiments described herein.

In an example embodiment, If the UE currently has existing calls and the UE tries for second call and receives an error response (e.g., a 5xx error), the existing calls will continue and no P-CSCF switch (de-registration on the current P-CSCF and registration on an alternative P-CSCF)/ silent redial as described herein will be performed for the pending call receiving the error response. FIG. 6A illustrates a logical flow diagram showing an example embodiment of a process 600, useful in the process of FIG. 4, for how to proceed when receiving an additional error response from the network and there are additional alternative P-CSCFs in accordance with embodiments described herein.

At 602, in response to sending the SIP INVITE request to the second P-CSCF, the first UE receives an additional error response preventing the call from connecting.

At 612, it is determined whether there are one or more additional alternative P-CSCFs in the same region as the first P-CSCF and second PCSCF that were made available to the UE via broadcast of respective P-CSCF IP addresses. If there are one or more such additional alternative P-CSCFs that were made available to the UE via broadcast of respective P-CSCF IP addresses, then the process 600 proceeds to 603 to attempt to use such one or more additional alternative P-CSCFs if a registration has not already been attempted on the additional alternative P-CSCF. If there are not one or more additional alternative P-CSCFs, the process 600 proceeds to 616.

At 603, if it is determined that a registration has already been attempted on the additional alternative P-CSCF, then the process 600 proceeds to 616. If it is determined that a registration has not already been attempted on the additional alternative P-CSCF, then the process 600 proceeds to 604.

At 604, the UE de-registers from a P-CSCF on which the UE is currently registered without ending the call on the call manager in the UE.

At 606 the UE registers on an additional alternative P-CSCF in the same region, the IP address of which had been previously broadcast to the UE prior to the registration on the first P-CSCF.

At 608 the UE sends an additional SIP INVITE request to the P-CSCF on which the UE is currently registered.

At 610, it is determined whether an error response was received in response to sending the additional SIP INVITE request to the P-CSCF on which the UE is currently registered. If the error response was not received, the process 600 proceeds to 614. If the error response was received, the process proceeds to 612.

At 614, the call is successfully established. After the call (e.g., the user selects end call on the UE), the UE stays registered on the P-CSCF on which the UE was registered during the call.

At 616, the UE terminates the voice call on the UE call manager thereby ending the dialog for establishing the call and ceasing to attempt to establish the call. The next call made by the user after the first voice call will start from the last registered P-CSCF and the UE will perform attempts on other P-CSCFs in a cyclic manner as above, if the attempted P-CSCF throws a network error (error code: 500/503/5xx).

Figure 6B:
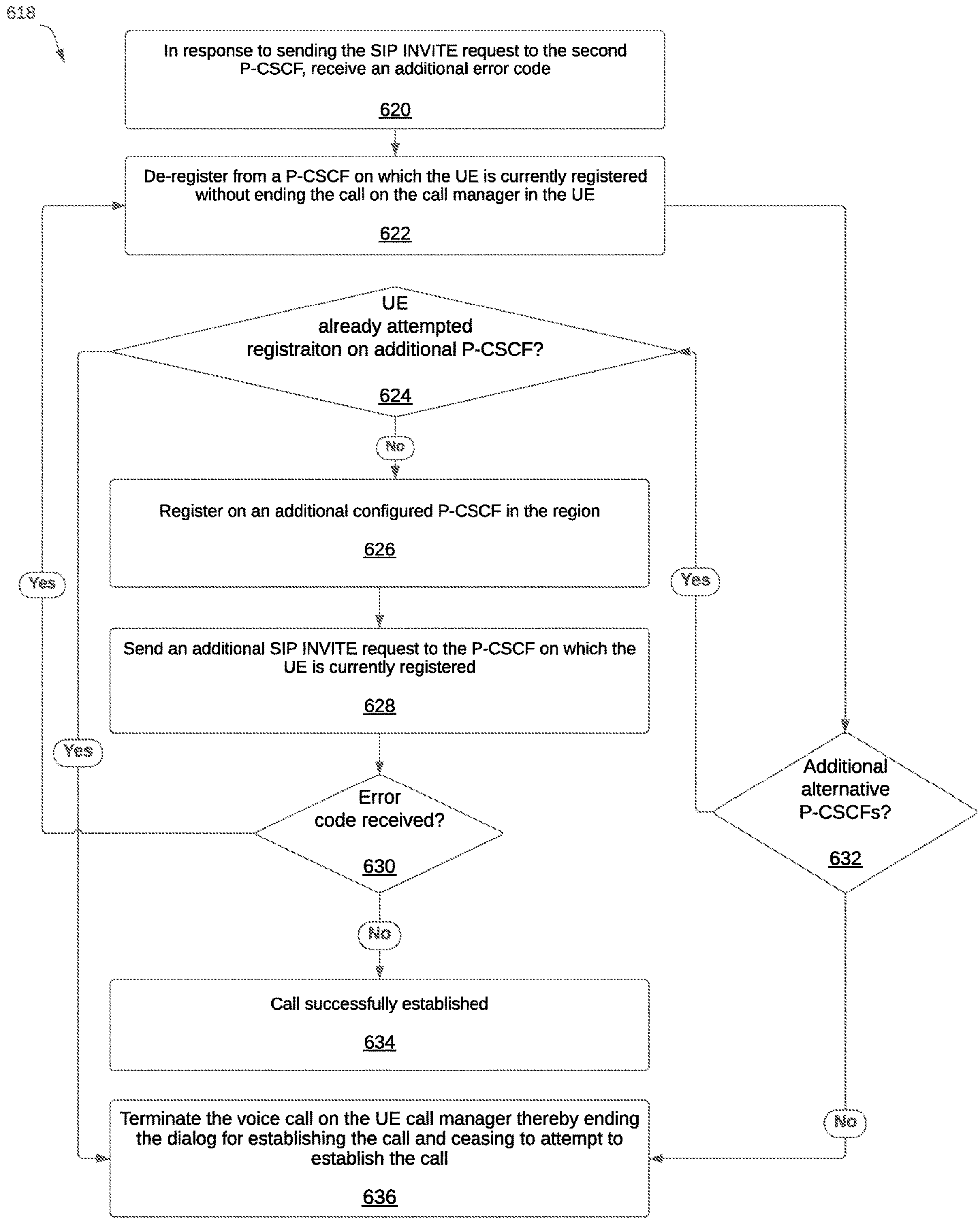
FIG. 6B illustrates a logical flow diagram showing another example embodiment of a process, useful in the process of FIG. 4, for how to proceed when receiving an additional error response from the network and there are additional alternative P-CSCFs in accordance with embodiments described herein.

FIG. 6B illustrates a logical flow diagram showing another example embodiment of a process 618, useful in the process of FIG. 4, for how to proceed when receiving an additional error response from the network and there are additional alternative P-CSCFs in accordance with embodiments described herein.

In contrast to process 600 shown in FIG. 6A, after first UE receives an additional error response preventing the call from connecting in step 620, the process 618 proceeds directly to 622 to de-register from a P-CSCF on which the UE is currently registered without ending the call on the call manager in the UE. Then the process 618 proceeds to 632 at which it is determined whether there are one or more additional alternative P-CSCFs in the same region as the first P-CSCF and second PCSCF that were made available to the UE via broadcast of respective P-CSCF IP addresses. If there are one or more such additional alternative P-CSCFs that were made available to the UE via broadcast of respective P-CSCF IP addresses, then the process 618 proceeds to 624 to attempt to use such one or more additional alternative P-CSCFs if a registration has not already been attempted on the additional alternative P-CSCF. If there are not one or more additional alternative P-CSCFs, the process 618 proceeds to 636.

At 603, if it is determined that a registration has already been attempted on the additional alternative P-CSCF, then the process 618 proceeds to 630. If it is determined that a registration has not already been attempted on the additional alternative P-CSCF, then the process 618 proceeds to 626.

At 626 the UE registers on an additional alternative P-CSCF in the same region, the IP address of which had been previously broadcast to the UE prior to the registration on the first P-CSCF.

At 628 the UE sends an additional SIP INVITE request to the P-CSCF on which the UE is currently registered.

At 630, it is determined whether an error response was received in response to sending the additional SIP INVITE request to the P-CSCF on which the UE is currently registered. If the error response was not received, the process 618 proceeds to 634. If the error response was received, the process proceeds to 622.

At 634, the call is successfully established. After the call (e.g., the user selects end call on the UE), the UE stays registered on the P-CSCF on which the UE was registered during the call.

At 636, the UE terminates the voice call on the UE call manager thereby ending the dialog for establishing the call and ceasing to attempt to establish the call. The next call made by the user after the first voice call will start from the last registered P-CSCF and the UE will perform attempts on other P-CSCFs in a cyclic manner as above, if the attempted P-CSCF throws a network error (error code: 500/503/5xx).

In an example embodiment, in response to receiving a subsequent error response after sending the additional SIP INVITE request to the additional alternative P-CSCF and there being no additional alternative P-CSCFs that were made available to the UE, the UE may end the dialog for establishing the call and cease to attempt to establish the call.

Figure 7:
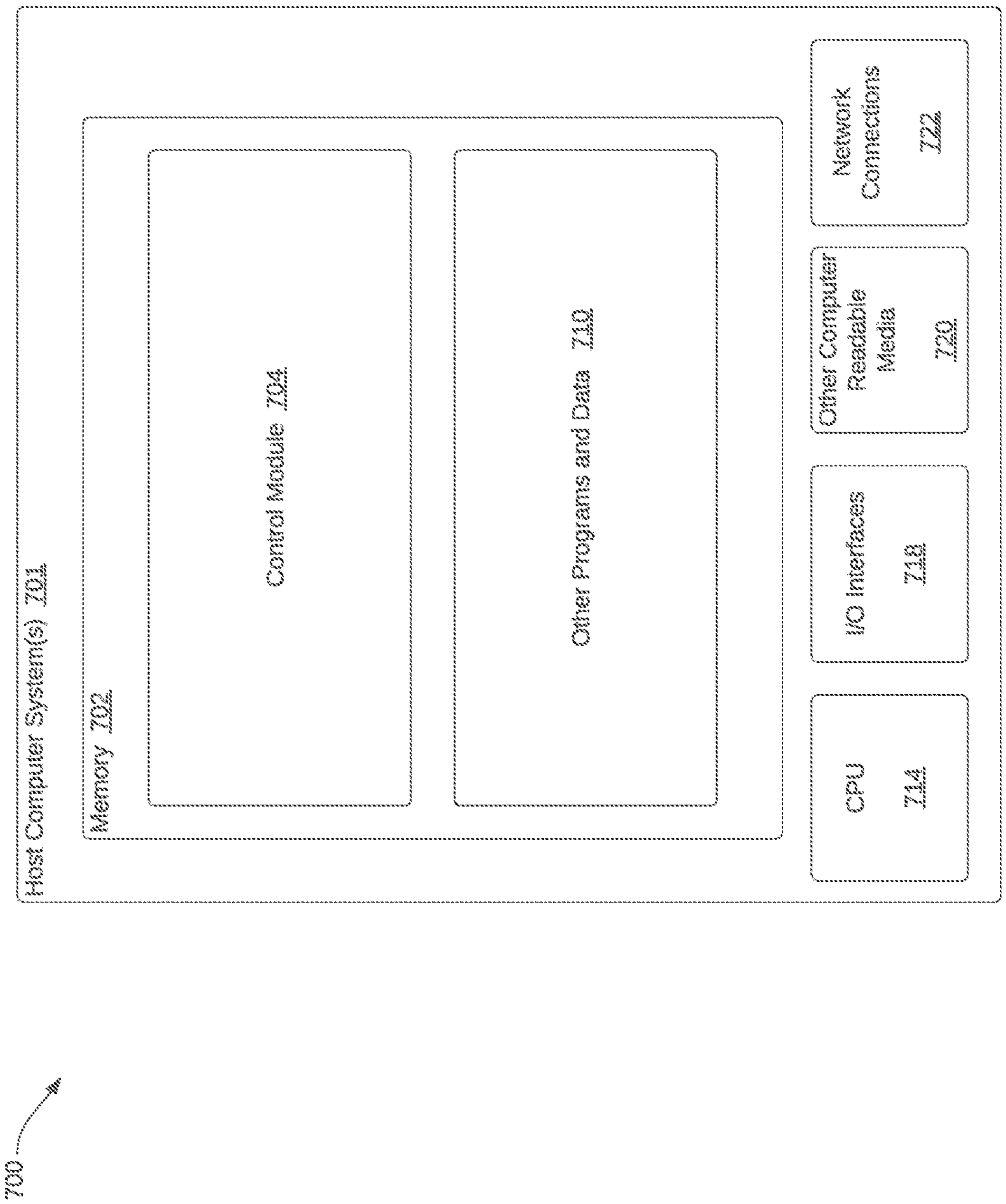
FIG. 7 shows a system diagram that describes an example implementation of computing system(s) for implementing embodiments described herein.

FIG. 7 shows a system diagram that describes an example implementation of computing system(s) for implementing embodiments described herein.

The functionality described herein for systems and methods for establishing a call on a cellular network, or components thereof, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility. However, FIG. 7 illustrates an example of underlying hardware on which such software and functionality may be hosted and/or implemented.

In particular, shown is example host computer system(s) 701. For example, such computer system(s) 701 may represent one or more of those in various UEs, data centers, base stations and cell sites that are, or that host or implement the functions of, aspects described herein to implement systems and methods for establishing a call on a cellular network. In some embodiments, one or more special-purpose computing systems may be used to implement the functionality described herein. Accordingly, various embodiments described herein may be implemented in software, hardware, firmware, or in some combination thereof. Host computer system(s) 701 may include memory 702, one or more central processing units (CPUs) 714, I/O interfaces 718, other computer-readable media 720, and network connections 722.

Memory 702 may include one or more various types of non-volatile and/or volatile storage technologies. Examples of memory 702 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 702 may be utilized to store information, including computer-readable instructions that are utilized by CPU 714 to perform actions, including those of embodiments described herein.

Memory 702 may have stored thereon control module(s) 704. The control module(s) 704 may be configured to implement and/or perform some or all of the functions of the systems, components and modules described herein to implement systems and methods for establishing a call on a cellular network. Memory 702 may also store other programs and data 710, which may include rules, databases, application programming interfaces (APIs), software containers, nodes, pods, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 722 are configured to communicate with other computing devices to facilitate the functionality described herein. In various embodiments, the network connections 722 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 718 may include a video interfaces, other data input or output interfaces, or the like. Other computer-readable media 720 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

a first user equipment device (UE) performing an Internet Protocol Multimedia Subsystem (IMS) registration in a cellular telecommunications network on a first Proxy-Call Session Control Function (P-CSCF) of the cellular telecommunications network;

the first UE sending a first Session Initiation Protocol (SIP) INVITE request to the first P-CSCF thereby initiating a dialog for establishing a call on the cellular telecommunications network with a second UE;

in response to sending the first SIP INVITE request, the first UE receiving an error response preventing the call from connecting; and after the first UE receives the error response:

the first UE de-registering from the first P-CSCF without ending an attempt to establish the call;

the first UE registering on a second P-CSCF operating at a same generation of mobile network technology standard as the first P-CSCF; and the first UE sending a second SIP INVITE request to the second P-CSCF to initiate the dialog for establishing the same call on the cellular telecommunications network with the second UE.

2. The method of claim 1 wherein the first UE de-registering from the first P-CSCF, the first UE registering on the second P-CSCF and the first UE sending the second SIP INVITE request to the second P-CSCF are performed silently without performing actions that would alert a UE user and while the UE still appears to be initiating the dialog for establishing the same call.

3. The method of claim 1 wherein the first UE de-registering from the first P-CSCF, the first UE registering on the second P-CSCF and the first UE sending the second SIP INVITE request to the second P-CSCF are performed silently while a call screen remains active on the UE indicating a call is currently being attempted.

4. The method of claim 1 wherein the first UE de-registering from the first P-CSCF, the first UE registering on the second P-CSCF and the first UE sending the second SIP INVITE request to the second P-CSCF are performed immediately in response to the first UE receiving the error response.

5. The method of claim 1 wherein the first UE de-registering from the first P-CSCF, the first UE registering on the second P-CSCF and the first UE sending the second SIP INVITE request to the second P-CSCF are performed in response to the first UE receiving the error response and the error response not indicating to re-try establishing the call through the first P-CSCF.

6. The method of claim 1 wherein the first UE waits a pre-determined amount of time to allow time for the UE to de-register from the first P-CSCF and register on the second P-CSCF before sending the second SIP INVITE request.

7. The method of claim 6, wherein the pre-determined amount of time is at least three seconds.

8. The method of claim 1 wherein the error response is Hypertext Transfer Protocol (HTTP) 500 series internal server error response.

9. The method of claim 1, further comprising:

in response to the first UE sending a second SIP INVITE request to the second P-CSCF, the call with the second UE being successfully established on the second P-CSCF.

10. The method of claim 9, further comprising the first UE remaining registered on the second P-CSCF after the call is ended until a next IMS registration is triggered either by the cellular telecommunications network or as a result of user input to the first UE.

11. The method of claim 1 wherein the first UE receives the error response from a Fifth Generation New Radio (5G NR) standalone (SA) network core.

12. The method of claim 1, further comprising, before performing the IMS registration on the first P-CSCF, the UE receiving an Internet Protocol (IP) address for the first P-CSCF and second P-CSCE, wherein the registration on the first P-CSCF is performed using the IP address of the first P-CSCF and the registration on the second P-CSCF is performed using the IP address of the P-CSCF.

13. The method of claim 1, further comprising:

in response to sending the second SIP INVITE request, the first UE receiving an additional error response preventing the call from connecting; and in response to receiving the additional error response, the first UE ending the dialog for establishing the call and ceasing to attempt to establish the call.

14. The method of claim 1, further comprising:

in response to sending the second SIP INVITE request, the first UE receiving an additional error response preventing the call from connecting; and in response to receiving the additional error response, cycling through a process including:

de-registering from a P-CSCF on which the first UE is currently registered;

then registering on an additional alternative P-CSCF, the an IP address of which had been previously broadcast to the first UE prior to the registration on the first P-CSCF; and then sending an additional SIP INVITE request to the P-CSCF on which the first UE is currently registered, until either:

the call is successfully established on a P-CSCF the first UE is currently registered on; or there are no additional alternative P-CSCFs that were made available to the first UE via broadcast of respective P-CSCF IP addresses, whichever occurs first.

15. The method of claim 14, further comprising:

in response to receiving a subsequent error response after sending the additional SIP INVITE request to the additional alternative P-CSCF and there being no additional alternative P-CSCFs that were made available to the first UE:

the first UE ending the dialog for establishing the call and ceasing to attempt to establish the call.

16. The method of claim 1 wherein the second P-CSCF is provided to the UE via broadcasting of an IP address of the second P-CSCF before the performing of the registration as a fallback alternative to the first P-CSCF during making a call such that the second P-CSCF is in a different geographical location within a same IMS region as the first P-CSCF.

17. The method of claim 16 wherein the error response is caused by an issue in a region of the first P-CSCF.

18. The method of claim 1 wherein:

the cellular telecommunications network is a 5G standalone (SA) cellular network including a 5G NR SA network core that is implemented entirely in one or more cloud computing servers;

the first P-CSCF is part of an IMS layer of the 5G NR SA network core and is configured to enable the UE to communicate using the 5G NR SA cellular network; and the second P-CSCF is part of the IMS layer of the 5G NR SA network core and is configured to enable the UE to communicate using the 5G NR SA cellular network.

19. The method of claim 1 wherein the call on the cellular telecommunications network is a Voice over New Radio (VoNR) call.

20. The method of claim 1 wherein the generation of mobile network technology standard is 5G NR.

* * * * *